US012574682B2

(12) United States Patent
Lee et al.

(10) Patent No.: US 12,574,682 B2
(45) Date of Patent: Mar. 10, 2026

(54) ELECTRONIC DEVICE FOR LISTENING TO EXTERNAL SOUND AND OPERATING METHOD OF ELECTRONIC DEVICE

(71) Applicant: SAMSUNG ELECTRONICS CO., LTD., Suwon-si (KR)

(72) Inventors: Jaeseong Lee, Suwon-si (KR); Hwan Shim, Suwon-si (KR); Hangil Moon, Suwon-si (KR); Jaeha Park, Suwon-si (KR); Kyoungho Bang, Suwon-si (KR); Seunghun O, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 219 days.

(21) Appl. No.: 18/461,069

(22) Filed: Sep. 5, 2023

(65) Prior Publication Data

US 2023/0412978 A1 Dec. 21, 2023

Related U.S. Application Data

(63) Continuation of application No. PCT/KR2022/003834, filed on Mar. 18, 2022.

(30) Foreign Application Priority Data

Mar. 18, 2021 (KR) ........................ 10-2021-0035342

(51) Int. Cl.
*H04R 3/04* (2006.01)
*G10L 25/78* (2013.01)
(Continued)

(52) U.S. Cl.
CPC ................ *H04R 3/04* (2013.01); *G10L 25/78* (2013.01); *H04R 3/005* (2013.01); *H04R 29/001* (2013.01)

(58) Field of Classification Search
CPC .. H04R 25/554; H04R 25/505; H04R 25/552; H04R 25/407; H04R 2225/43;
(Continued)

(56) References Cited

U.S. PATENT DOCUMENTS 6,829,361 B2 12/2004 Aarts
8,655,003 B2 2/2014 Duisters et al.
(Continued)

FOREIGN PATENT DOCUMENTS

JP H07107599 A 4/1995
JP 2014030254 A 2/2014
(Continued)

OTHER PUBLICATIONS

International Search Report for PCT/KR2022/003834, mailed Jun. 28, 2022, 4 pages.
(Continued)

*Primary Examiner* — Lun-See Lao
(74) *Attorney, Agent, or Firm* — NIXON & VANDERHYE P.C.

(57) ABSTRACT

The present disclosure relates to an electronic device and an operating method thereof, the electronic device comprising: a speaker; an external microphone configured to obtain an external signal for the electronic device; an internal microphone positioned within a specified distance of the speaker and configured to obtain an internal signal including a signal output from the speaker and/or a signal obtained from the signal output from the speaker and reflected by an external object; a memory storing a first transfer function generated on the basis of the signal output from the speaker and obtained by the internal microphone, and/or a second transfer function generated on the basis of the signal obtained from the signal output from the speaker and reflected by the external object, the signal being obtained by the internal
(Continued)

microphone; and a processor operatively connected to the speaker, the external microphone, and the internal microphone, wherein the processor may be configured to: convert a signal obtained by the external microphone into an external frequency signal in the frequency domain; convert a signal obtained by the internal microphone into an internal frequency signal in the frequency domain; calculate a first compensation value on the basis of comparing the external frequency signal with the internal frequency signal; and control an output signal output from the speaker, on the basis of the external signal obtained by the external microphone, the first compensation value, and the first transfer function and/or the second transfer function.

18 Claims, 8 Drawing Sheets

(51) Int. Cl.
*H04R 3/00* (2006.01)
*H04R 29/00* (2006.01)

(58) Field of Classification Search
CPC .......... H04R 2225/55; H04R 2225/025; H04R 25/558; H04R 25/453; H04R 2225/41; H04R 25/405; H04R 25/70; H04R 2225/51; H04R 2225/023; H04R 2225/0216; H04R 2203/12; H04R 2225/81; H04R 2225/83; H04R 2420/09; H04R 2430/00; H04R 2430/21; H04R 25/402; H04R 25/502; H04R 25/659; H04R 1/028; H04R 1/1066; H04R 2201/109; H04R 2499/15; H04R 25/02; H04R 29/005; H04R 5/027; H04S 2420/01; H04S 1/005; H04S 1/007; H04S 2400/01; H04S 5/00; H04S 7/00; H04S 7/303; H04S 2400/05; H04S 7/302; H04S 2400/11; H04S 3/008; H04S 5/005; H04S 7/40; H04S 2400/13; H04S 2400/15; H04S 2420/07; H04S 7/30; G10K 2210/1081; G10K 11/17854; G10K 11/17827; G10K 11/17837; G10K 11/17825; G10K 11/17875; G10K 11/17881; G10K 11/17885; G10K 2210/3012; G10K 2210/3028; G10K 11/17821; G10K 11/17857; G10K 2210/3016; G10K 2210/506; G10K 11/178; G10K 2210/3216; G10K 11/002; G10K 11/175; G10K 11/17813; G10K 11/17817; G10K 2210/108; G10K 2210/30232; G10K 2210/3038; G10K 11/1754; G10K 11/17815; G10K 11/17819; G10K 11/17823; G10K 11/17861; G10K 11/22; G10K 2210/116; G10K 2210/3026; G10K 2210/3039; G10K 2210/3045
USPC .................. 381/56–58, 312, 314, 92; 700/94
See application file for complete search history.

(56) References Cited

U.S. PATENT DOCUMENTS

| | | | | |
|---|---|---|---|---|
| 9,369,557 | B2 | 6/2016 | Kaller et al. | |
| 10,034,092 | B1 | 7/2018 | Nawfal et al. | |
| 10,511,915 | B2 | 12/2019 | Miller et al. | |
| 10,721,562 | B1 * | 7/2020 | Rui | H04R 1/406 |
| 10,810,989 | B2 | 10/2020 | Goldstein et al. | |
| 10,951,990 | B2 | 3/2021 | Nawfal et al. | |
| 11,019,421 | B2 | 5/2021 | Lee et al. | |
| 11,056,094 | B2 | 7/2021 | Park et al. | |
| 11,221,820 | B2 | 1/2022 | Lee et al. | |
| 12,249,326 | B2 * | 3/2025 | Usher | G10L 15/22 |
| 2006/0062380 | A1 | 3/2006 | Kim et al. | |
| 2007/0180913 | A1 | 8/2007 | Higashihara | |
| 2011/0194713 | A1 * | 8/2011 | Apfel | H04R 25/43 381/314 |
| 2016/0165361 | A1 * | 6/2016 | Miller | H04R 25/43 381/317 |
| 2020/0258539 | A1 | 8/2020 | Shim et al. | |

FOREIGN PATENT DOCUMENTS

| | | | |
|---|---|---|---|
| KR | 0827146 | B1 | 5/2008 |
| KR | 101093847 | B1 | 12/2011 |
| KR | 101319983 | B1 | 10/2013 |
| KR | 20200008896 | A | 1/2020 |
| KR | 20200098323 | A | 8/2020 |
| KR | 20200116323 | A | 10/2020 |

OTHER PUBLICATIONS

Written Opinion of the ISA for PCT/KR2022/003834, mailed Jun. 28, 2022, 3 pages.
Office Action for KR Application No. 10-2021-0035342 dated Sep. 4, 2025 and English translation, 15 pages.

* cited by examiner

ELECTRONIC DEVICE FOR LISTENING TO EXTERNAL SOUND AND OPERATING METHOD OF ELECTRONIC DEVICE

CROSS-REFERENCE TO RELATED APPLICATIONS

This application is a continuation of International Application No. PCT/KR2022/003834 designating the United States, filed on Mar. 18, 2022, in the Korean Intellectual Property Receiving Office and claiming priority to Korean Patent Application No. 10-2021-0035342, filed on Mar. 18, 2021, in the Korean Intellectual Property Office, the disclosures of each of which are incorporated by reference herein in their entireties.

BACKGROUND

Field

The disclosure relates to an electronic device and a method of operating the electronic device and, for example, to an electronic device for listening to an external sound around a user and a method of operating the electronic device.

Description of Related Art

A speaker driver allowing a user to listen to a specific sound may be implemented in the form such as earphones worn on the user's ears or a headset worn on the user's head.

Earphones inserted near the external auditory meatus of the ears or the headset completely covering the ears may be located between the outside and eardrums, and thus the user may not hear a sound from the outside while the user is wearing the same.

Accordingly, the earphones and/or the headset may include a microphone implemented outside the earphones and/or the headset, and an external sound acquired from the microphone implemented outside may be output to a speaker included in the earphones and/or the headset, so that the user wearing the earphones and/or the headset can listen to an external sound through the earphones and/or the headset The earphones and/or the headset needs a process of inputting the external sound acquired from the external microphone into an appropriate filter and processing the external sound in order to allow the user wearing the earphones and/or the headset to naturally hear the external sound.

Earphones and/or headset input external sounds acquired from an external microphone into an appropriate filter and output the sounds into a speaker, so as to allow a user to naturally hear an external sound.

SUMMARY

Embodiments of the disclosure may control a sound output from a speaker by compensating distortions due to an echo which may be generated inside the user's ears or sound leakage which may be generated in the headset in order to allow the user to hear a sound which is the same as the sound to which the user listens outside.

Embodiments of the disclosure may acquire a sound output from a speaker through an internal microphone or a sound output from the speaker and reflected from the ear drum or the external auditory meatus, compare the sound with the external sound acquired through the external microphone, and control an output signal such that the sound output from the speaker is the same as the external sound.

Embodiments of the disclosure may output a user-personalized audio by controlling the output signal on the basis of an audiogram related to an auditory property of the user.

The disclosure is not limited to the above mentioned technical subjects, and other technical subjects which are not mentioned may be clearly understood through the following descriptions by those skilled in the art of the disclosure.

An electronic device according to various example embodiments of the disclosure includes: a speaker, an external microphone configured to acquire an external signal of the electronic device, an internal microphone located around the speaker and configured to acquire an internal signal including a signal output from the speaker and/or a signal output from the speaker and reflected from an external object, a memory configured to store a first transfer function generated based on the signal output from the speaker, acquired by the internal memory, and/or a second transfer function generated based on the signal output from the speaker, acquired by the internal microphone, and reflected from the external object, and a processor operatively connected to the speaker, the external microphone, and the internal microphone, wherein the processor is configured to: convert a signal acquired by the external microphone into an external frequency signal in a frequency domain, convert a signal acquired by the internal microphone into an internal frequency signal in the frequency domain, calculate a first compensation value, based on a result of comparison between the external frequency signal and the internal frequency signal, and control an output signal output from the speaker, based on an external signal acquired from the external microphone, the first compensation value, the first transfer function, and/or the second transfer function.

A method of operating an electronic device according to various example embodiments of the disclosure includes: converting an external signal of the electronic device acquired by an external microphone into an external frequency signal in a frequency domain, converting a signal output from a speaker, acquired by an internal microphone and/or a signal output from a speaker and reflected from an external object into an internal frequency signal in the frequency domain, calculating a first compensation value, based on a result of comparison between the external frequency signal and the internal frequency signal, and controlling an output signal output from the speaker, based on the first transfer function generated based on the external signal, the first compensation value, and the signal output from the speaker, acquired by the internal microphone and/or the second transfer function generated based on the signal output from the speaker and reflected from the external object.

According to various example embodiments, the user can naturally hear an external sound while the user is wearing an electronic device.

According to various example embodiments, the electronic device can provide a sound that can be reproduced similarly, such that the external sound is transmitted as it is.

According to various example embodiments, the electronic device performs equalizing to fit an auditory property of the user, and thus the user wearing the electronic device can hear an external sound controlled to fit the auditory property of the user.

According to various example embodiments, the electronic device can prevent and/or reduce confusion of directions due to a level difference between both ears which the user may experience by outputting synchronized sounds through a pair of electronic devices.

BRIEF DESCRIPTION OF THE DRAWINGS

In connection with a description of drawings, the same or similar reference numerals may be used for the same or similar elements. Further, the above and other aspects, features and advantages of certain embodiments of the present disclosure will be more apparent from the following detailed description, taken in conjunction with the accompanying drawings, in which.

DETAILED DESCRIPTION

Figure 1:
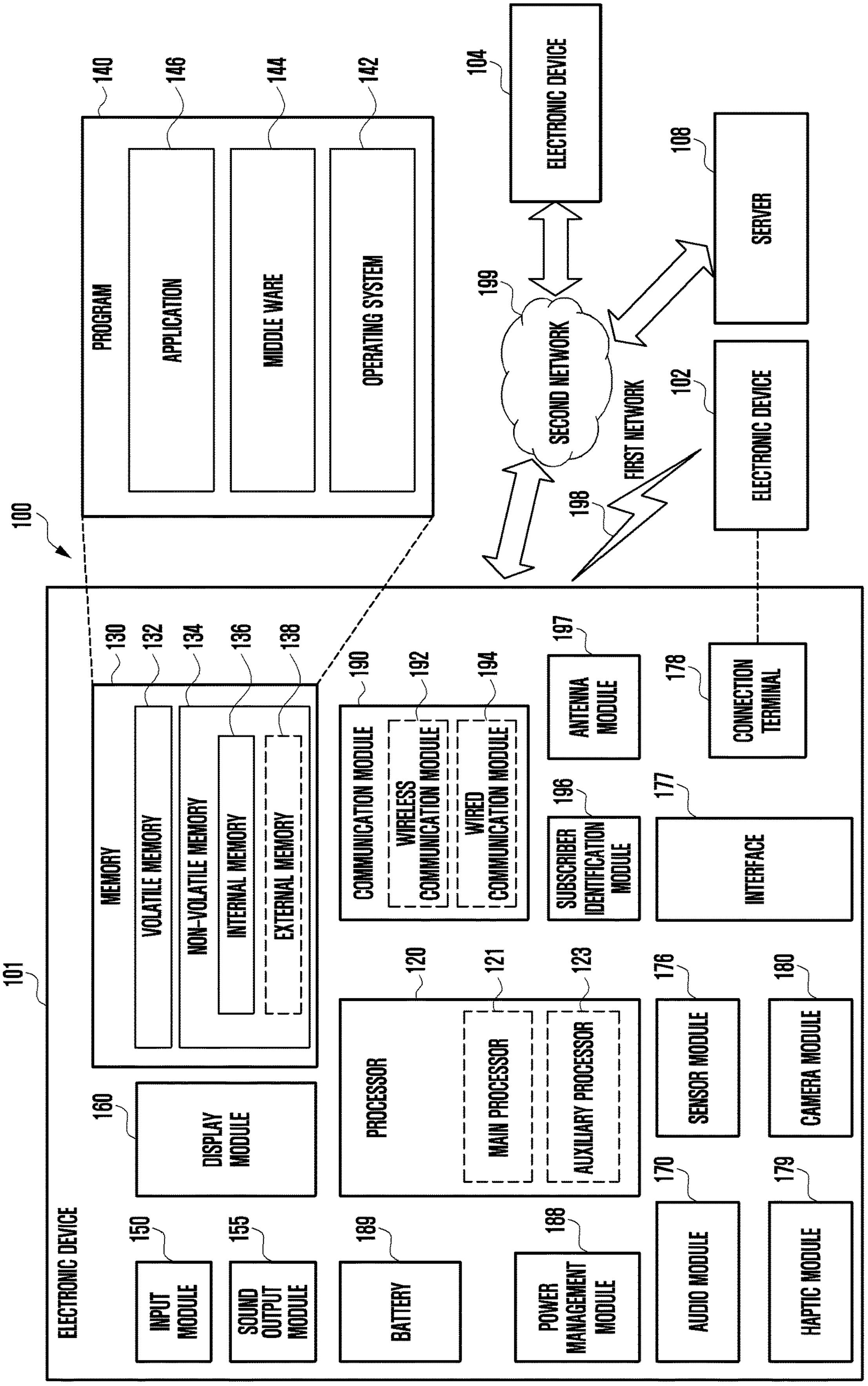
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
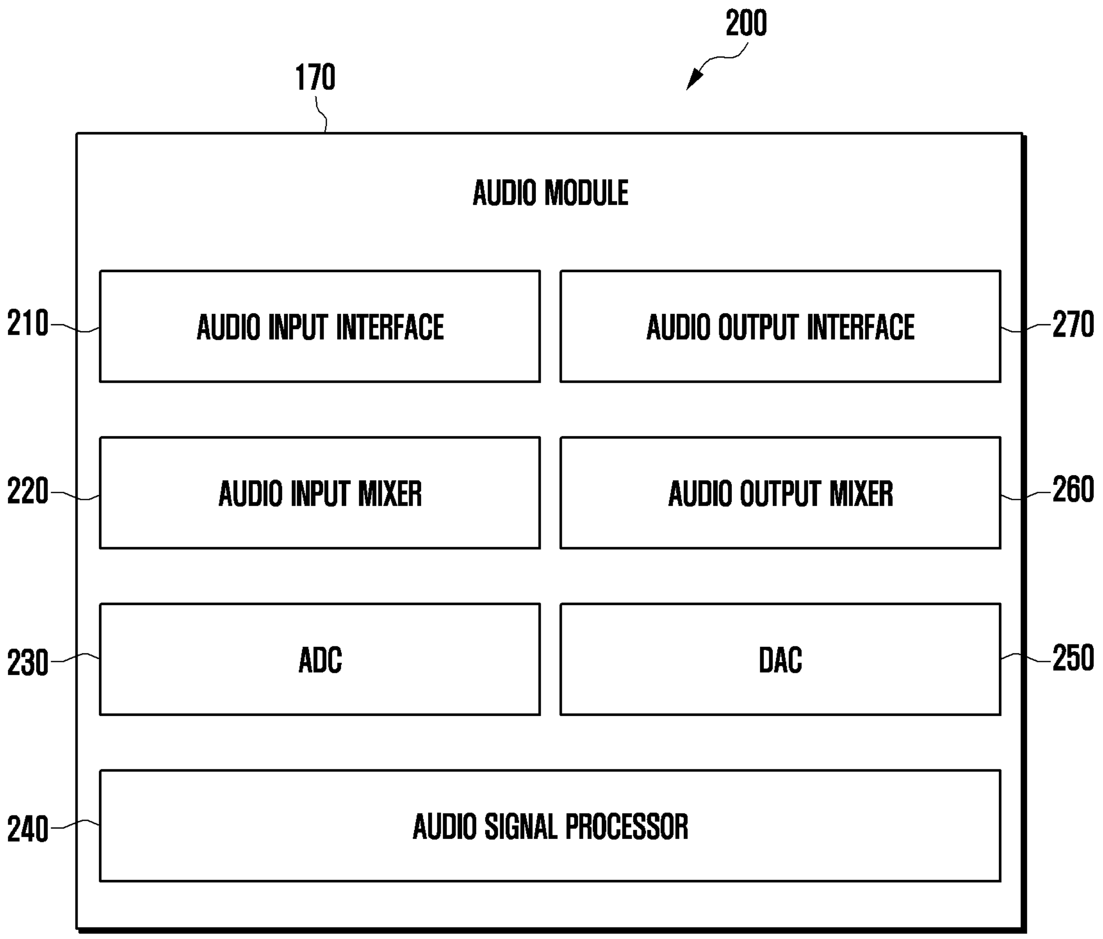
FIG. 2 is a block diagram illustrating an example configuration of an audio module according to various embodiments.

FIG. 2 is a block diagram 200 illustrating an example configuration of the audio module 170 according to various embodiments. Referring to FIG. 2, the audio module 170 may include, for example, an audio input interface 210, an audio input mixer 220, an analog to digital converter (ADC) 230, an audio signal processor (e.g., including signal processing circuitry) 240, a digital to analog converter (DAC) 250, an audio output mixer 260, and/or an audio output interface 270.

The audio input interface 210 may receive an audio signal corresponding to a sound acquired from the outside of the electronic device 101 through a microphone (for example, a dynamic microphone, a condenser microphone, or a piezo microphone) which is a part of the input module 150 or is configured separately from the electronic device 101. For example, when the audio signal is acquired from the external electronic device 102 (for example, a headset or a microphone), the audio input interface 210 may be directly connected to the external electronic device 102 through the connectivity terminal 178 or wirelessly connected thereto through the wireless communication module 192 to receive the audio signal. According to an embodiment, the audio input interface 210 may receive a control signal (for example, a volume control signal received through an input button) related to the audio signal acquired from the external electronic device 102. The audio input interface 210 may include a plurality of audio input channels and may receive different audio signals corresponding to respective audio input channels among the plurality of audio input channels. According to an embodiment, additionally or alternatively, the audio input interface 210 may receive an audio signal from another element (for example, the processor 120 or the memory 130) of the electronic device 101.

The audio input mixer 220 may synthesize a plurality of input audio signals into at least one audio signal. For example, according to an embodiment, the audio input mixer 220 may synthesize a plurality of analog audio signals input through the audio input interface 210 into at least one analog audio signal.

The ADC 230 may convert an analog audio signal into a digital audio signal. For example, according to an embodiment, the ADC 230 may convert the analog audio signal received through the audio input interface 210 or additionally or alternatively convert an analog audio signal synthesized through the audio input mixer 220 into a digital audio signal.

The audio signal processor 240 may include various circuitry and/or executable program instructions and perform various processing for a digital audio signal input through the ADC 230 or a digital audio signal received from another element of the electronic device 101. For example, according to an embodiment, the audio signal processor 240 may change a sampling rate for one or more digital audio signals, apply one or more filters, process interpolation, amplify or attenuate all or some frequency bands, process noise (for example, attenuate noise or echo), change a channel (for example, switching between mono and stereo), perform mixing, or extract a predetermined signal. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal acquired from another element (for example, the processor 120 or the memory 130) of the electronic device 101 into an analog signal.

The audio output mixer 260 may synthesize a plurality of audio signals to be output into at least one audio signal. For example, according to an embodiment, the audio output mixer 260 may synthesize an audio signal converted into an analog signal through the DAC 250 and another analog audio signal (for example, an analog audio signal received through the audio input interface 210) into at least one analog audio signal.

The audio output interface 270 may output the analog audio signal converted through the DAC 250 or additionally or alternatively output the analog audio signal synthesized by the audio output mixer 260 to the outside of the electronic device 101 through the sound output module 155. The sound output module 155 may include a speaker, for example, a dynamic driver or a balanced armature driver or a receiver. According to an embodiment, the sound output module 155 may include a plurality of speakers. In this case, the audio output interface 270 may output audio signals having a plurality of different channels (for example, stereo or 5.1 channel) through at least some of the plurality of speakers. According to an embodiment, the audio output interface 270 may be directly connected to the external electronic device 102 (for example, an external speaker or a headset) through the connectivity terminal 178 or wirelessly connected thereto through the wireless communication module 192 to output audio signals.

According to an embodiment, the audio module 170 may synthesize a plurality of digital audio signals through at least one function of the audio signal processor 240 to generate at least one digital audio signal without a separate audio input mixer 220 or audio output mixer 260.

According to an embodiment, the audio module 170 may include an audio amplifier (not shown) (for example, a speaker amplification circuit) capable of amplifying an analog audio signal input through the audio input interface 210 or an audio signal to be output through the audio output interface 270. According to an embodiment, the audio amplifier may be configured as a module separated from the audio module 170.

Figure 3:
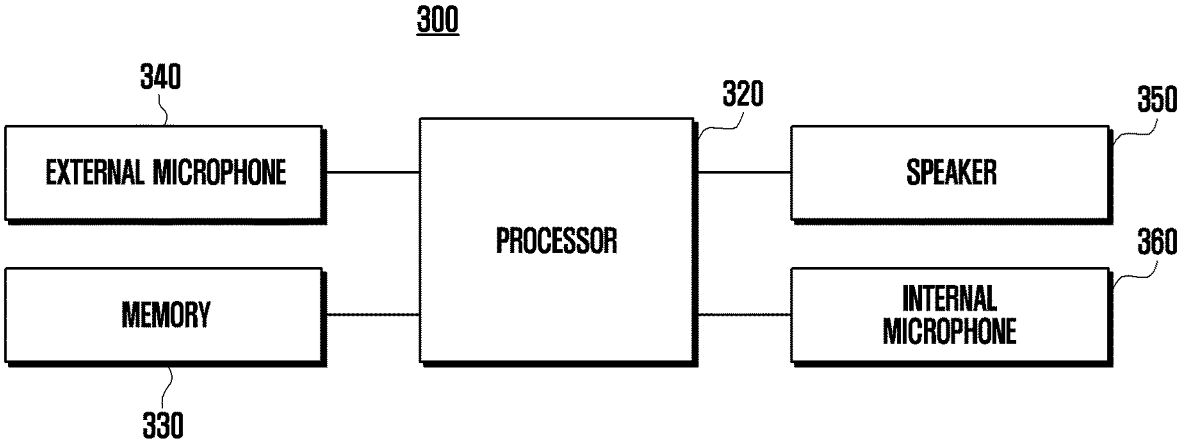
FIG. 3 is a block diagram illustrating an example configuration of an electronic device according to various embodiments.

FIG. 3 is a block diagram illustrating an example configuration of an electronic device according to various embodiments.

Referring to FIG. 3, an electronic device 300 (for example, the electronic device 101 of FIG. 1) may include a processor (e.g., including processing circuitry) 320 (for example, the processor 120 of FIG. 1), a memory 330 (for example, the memory 130 of FIG. 1), an external microphone 340, a speaker 350 (for example, the sound output module 155 of FIG. 1), and/or an internal microphone 360. The elements included in FIG. 3 are some of the elements included in the electronic device 300, and the electronic device 300 may include various other elements as illustrated in FIG. 1.

The memory 330 according to various embodiments may store at least one of a first transfer function, a second transfer function, and user information, wherein each of the functions may include various program instructions.

According to an embodiment, the first transfer function may be a transfer function indicting a transfer characteristic of a signal according to a space between the speaker 350 and the internal microphone 360. For example, the first transfer function may be a function indicating the relationship (for example, size) between a signal output through the speaker 350 and a signal received by the internal microphone 360. For example, the first transfer function may be a function indicating a characteristic of the signal received by the internal microphone 360 according to a change in a frequency of the signal output through speaker 350. According to an embodiment, the first transfer function may be generated on the basis of the signal output from the speaker 350 and the signal acquired by the internal microphone 360. For example, the first transfer function may be a function related to a characteristic of a path along which the signal output from the speaker 350 is input into the internal microphone 360. According to an embodiment, the first transfer function may be changed according to a change in the characteristic of the path.

According to an embodiment, the second transfer function may be a transfer function indicating a transfer characteristic of the signal according to a space between the speaker 350, the external object, and the internal microphone 360. For example, the second transfer function may be a function indicating the relationship (for example, size) between a signal output through the speaker 350 and a signal reflected from the external object and then received by the internal microphone 360. For example, the second transfer function may be a function indicating a characteristic of the signal reflected from the external object and then received by the internal microphone 360 according to a change in a frequency of the signal output through the speaker 350. According to an embodiment, the second transfer function may be generated on the basis of the signal output from the speaker 350 and the signal reflected from the external object and acquired by the internal microphone 360. For example, the second transfer function may be a function related to a characteristic of a path along which the signal output from the speaker and reflected from the external object is input into the internal microphone 360. According to an embodiment, the second transfer function may be changed according to a change in the characteristic of the path. The external object may be a body part of the user (for example, the external auditory meatus and/or the eardrum of the user) wearing the electronic device 300. For example, the second transfer function may be a function related to the characteristic of the path based on a characteristic of the external auditory meatus and/or the eardrum of the user wearing the electronic device 300.

According to an embodiment, the user information may be information (for example, an audiogram) related to an auditory property of the user. For example, the user information may include at least one of piece of information input by the user (for example, medical checkup data), information measured by the electronic device 300 (for example, the result of a test performed by the electronic device to identify a frequency band of a sound to which the user can listen), and/or information determined by the electronic device 300 on the basis of user preference (for example, information of analyzing a history of controlling a volume by the user).

The external microphone 340 according to various embodiments may be located in an external ear area of the electronic device 300 to acquire an external input signal. According to an embodiment, the external input signal is a signal acquired by the external microphone 340 and may include at least some of the signals generated outside the electronic device 300. According to an embodiment, when the user wears the electronic device 300 on the ears, the external microphone 340 may be installed to be located near the external ears. According to an embodiment, the external microphone 340 may acquire an external input signal corresponding to a sound acquired from the outside of the electronic device 300. For example, the sound acquired by the external microphone 340 from the outside may be a sound generated around the user while the user is wearing the electronic device 300.

According to an embodiment, the external input signal may include one of an external sound wave, an external electrical signal, and/or an external PCM signal.

The speaker 350 according to various embodiments may be located in an internal ear area of the electronic device 300 to output a signal in a direction of the user's eardrums. According to an embodiment, when the user wears the electronic device 300 on his/her ears, the speaker 350 may be mounted to be located near the external auditory meatus and/or the eardrum. According to an embodiment, the speaker 350 may output an acoustic signal to the outside of the electronic device 300 on the basis of a signal controlled by the processor 320.

The internal microphone 360 according to various embodiments may be located in the internal ear area of the electronic device 300 to acquire an internal input signal. According to an embodiment, the internal input signal is a signal acquired by the internal microphone 360 and may include at least some of the signals output by the speaker 350. According to an embodiment, when the user wears the electronic device 300 on his/her ears, the internal microphone 360 may be installed to be located near the external auditory meatus and/or the eardrum. According to an embodiment, the internal microphone 360 may acquire an internal input signal corresponding to a sound acquired between the electronic device 300 and the external object. For example, the sound acquired by the internal microphone 360 may be a sound output from the speaker 350 and/or a sound obtained after the sound output from the speaker 350 is reflected from the external object.

According to an embodiment, the internal input signal may include an internal sound wave, an internal electrical signal, and/or an internal PCM signal.

Figure 4:
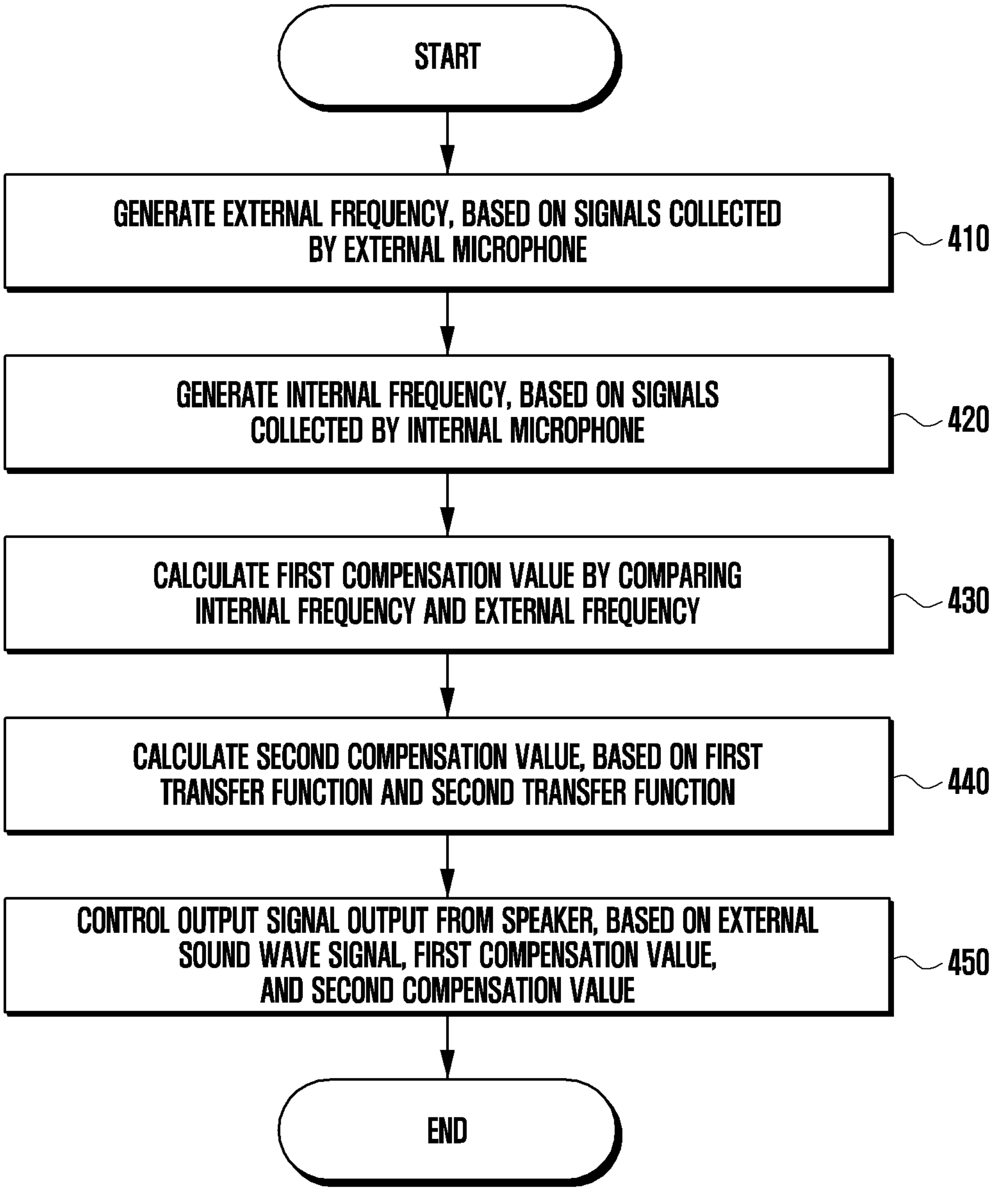
FIG. 4 is a flowchart illustrating an example method by which a processor controls a signal to be output from a speaker on the basis of signals acquired from an external microphone and an internal microphone according to various embodiments.

FIG. 4 is a flowchart illustrating an example method by which a processor (for example, the processor 320 of FIG. 3) controls a signal to be output from a speaker (for example, the speaker 350 of FIG. 3) on the basis of a signal acquired from an external microphone (for example, the external microphone 340 of FIG. 3) and an internal microphone (for example, the internal microphone 360 of FIG. 3) according to various embodiments.

According to various embodiments, the processor 320 may control the signal output from the speaker 350 in order to allow the user wearing the electronic device 300 to hear outside sounds around the user.

According to various embodiments, the processor 320 may generate an external frequency signal based on signals collected by the external microphone 340 in operation 410.

According to an embodiment, the external microphone 340 may be located in an external auditory meatus area of the electronic device 300 to acquire an external input signal. According to an embodiment, the external input signal may include a signal acquired by the external microphone 340 and may include at least some of the signals generated outside the electronic device 300. According to an embodiment, when the user wears the electronic device 300 on the ears, the external microphone 340 may be installed to be located near the external ears. According to an embodiment, the external microphone 340 may acquire an external input signal corresponding to the sound acquired from the outside. For example, the sound acquired by the external microphone 340 from the outside may be a sound generated around the user while the user is wearing the electronic device 300. According to an embodiment, the external input signal may include one of an external sound wave, an external electrical signal, and/or an external PCM signal.

According to an embodiment, the external microphone 340 may convert the acquired external sound wave into an external electrical signal. For example, the external microphone 340 may convert the external signal which is an acoustic signal into an external electrical signal which is an electric signal. For example, the external microphone 340 may include a membrane (not shown), and may generate an external electrical signal corresponding to vibration of the membrane by the external signal.

According to an embodiment, the external microphone 340 may digitalize the converted external electrical signal into an external pulse coded modulation (PCM) signal. For example, the external microphone 340 may convert an external electrical signal which is an analog signal into an external PCM signal which is a digital signal. For example, the external microphone 340 may generate the external PCM signal through digitalization according to a process of sampling the external electrical signal into uniform sections, quantizing the same by a representative value of the sections, and encoding the same into a digital binary code.

According to an embodiment, the processor 320 may convert the converted external PCM signal which is a signal in the time domain into an external frequency signal which is a signal in the frequency domain. For example, the processor 320 may perform fast Fourier transform (FFT) for the converted PCM signal to generate an external frequency signal.

According to various embodiments, the processor 320 may generate an internal frequency based on signals collected by the internal microphone 360 in operation 420.

The internal microphone 360 according to various embodiments may be located in the internal ear area of the electronic device 300 to acquire an internal input signal. According to an embodiment, the internal input signal may include a signal acquired by the internal microphone 360 and may include at least some of the signals output by the speaker 350. According to an embodiment, when the user wears the electronic device 300 on his/her ears, the internal microphone 360 may be mounted to be located near the external auditory meatus. According to an embodiment, the internal microphone 360 may acquire an internal input signal corresponding to a sound acquired between the electronic device 300 and the external object. For example, the sound acquired by the internal microphone 360 may be a sound output from the speaker 350 and/or a sound output from the speaker 350 and reflected from an external object 501.

According to an embodiment, the internal input signal may include at least one of an internal sound wave, an internal electrical signal, and/or an internal PCM signal.

According to an embodiment, the internal microphone 360 may convert the acquired internal sound wave into an internal electrical signal. For example, the internal microphone 360 may convert the internal sound wave which is an acoustic signal into an internal electrical signal which is an electric signal. For example, the internal microphone 360 may include a membrane (not shown), and may generate an internal electrical signal corresponding to vibration of the membrane by the internal sound waveform.

According to an embodiment, the internal microphone 360 may digitalize the converted internal electrical signal into an internal pulse coded modulation (PCM) signal. For example, the internal microphone 360 may convert an internal electrical signal which is an analog signal into an internal PCM signal which is a digital signal. For example, the internal microphone 360 may generate the external PCM signal through digitalization according to a process of sampling the internal electrical signal into uniform sections, quantizing the same by a representative value of the sections, and encoding the same into a digital binary code.

According to an embodiment, the processor 320 may convert the converted internal PCM signal which is the signal in the time domain into the internal frequency signal which is the signal in the frequency domain. For example, the processor 320 may perform fast Fourier transform (FFT) for the converted internal PCM signal to generate an internal frequency signal.

According to various embodiments, the processor 320 may compare the external frequency signal and the internal frequency signal to calculate a first compensation value in operation 430.

According to an embodiment, the processor 320 may calculate the first compensation value based on a result of calculation of difference between the external frequency signal and the internal frequency signal.

According to an embodiment, the processor 320 may acquire a first transfer function and a second transfer function stored in a memory (for example, the memory 330 of FIG. 3).

According to an embodiment, the first transfer function may include a transfer function indicting a transfer characteristic of a signal according to a space between the speaker 350 and the internal microphone 360. For example, the first transfer function may be a function indicating the relationship (for example, size) between a signal output through the speaker 350 and a signal received by the internal microphone 360. For example, the first transfer function may be a function indicating a characteristic of the signal received by the internal microphone 360 according to a change in a frequency of the signal output through speaker 350. According to an embodiment, the first transfer function may be generated on the basis of the signal output from the speaker 350 and the signal acquired by the internal microphone 360. For example, the first transfer function may be a function related to a characteristic of a path along which the signal output from the speaker 350 is input into the internal microphone 360. According to an embodiment, the first transfer function may be changed according to a change in the characteristic of the path.

According to an embodiment, the second transfer function may include a transfer function indicating a transfer characteristic of the signal according to a space between the speaker 350, the external object, and the internal microphone 360. For example, the second transfer function may be a function indicating the relationship (for example, size) between a signal output through the speaker 350 and a signal reflected from the external object and then received by the internal microphone 360. For example, the second transfer function may be a function indicating a characteristic of the signal reflected from the external object and then received by the internal microphone 360 according to a change in a frequency of the signal output through the speaker 350. According to an embodiment, the second transfer function may be generated on the basis of the signal output from the speaker 350 and the signal reflected from the external object and acquired by the internal microphone 360. For example, the second transfer function may be a function related to a characteristic of a path along which the signal output from the speaker 350 and reflected from the external object is input into the internal microphone 360. According to an embodiment, the second transfer function may be changed according to a change in the characteristic of the path. The external object may be a body part of the user (for example, the external auditory meatus and/or eardrum of the user) wearing the electronic device 300. For example, the second transfer function may be a function related to the characteristic of the path based on a characteristic of the external auditory meatus and/or the eardrum of the user wearing the electronic device 300. According to an embodiment, the external object may be an object (for example, MIC of head & torso system) for reflecting a standard internal ear characteristic. For example, the second transfer function may be a function related to a characteristic of a path based on the characteristic of the structure of the standard internal ear.

According to various embodiments, the processor 320 may calculate a second compensation value based on the first transfer function and the second transfer function in operation 440.

According to an embodiment, the processor 320 may calculate the second compensation value on the basis of the first transfer function and the second transfer function stored in the memory 330. The processor 320 may generate the second compensation value on the basis of a result of multiplication of the first transfer function and the second transfer function. For example, the processor 320 may determine the multiplication (frequency domain) of the first transfer function and the second transfer function as the second compensation value. In another example, the processor 320 may determine a result of the convolution operation (time domain) between the first transfer function and the second transfer function as the second compensation value.

According to various embodiments, the processor 320 may control a signal to be output from the speaker 350 based on an external sound wave signal, the first compensation value and/or the second compensation value in operation 450.

According to an embodiment, the processor 320 may input an external input signal acquired from the external microphone 340 into a function generated on the basis of the first compensation value and the second compensation value to generate an output signal. For example, the processor 320 may generate an output signal on the basis of a result of multiplication (frequency domain) of the external input signal, the first compensation value, and an inverse function of the second compensation value. In another example, the processor 320 may generate an output signal on the basis of a result of the convolution operation (time domain) among the external input signal, the first compensation value, and the inverse function of the second compensation value.

According to an embodiment, the processor 320 may configure an audio equalizer (EQ) on the basis of the function generated according to the first compensation value and the second compensation value and store the configured EQ value in the memory 330.

According to an embodiment, the processor 320 may input an external input signal acquired from the external microphone 340 into a function generated on the basis of the first compensation value, the second compensation value, and user information to generate an output signal. For example, the processor 320 may generate an output signal on the basis of a result of multiplication (frequency domain) of the external input signal, the first compensation value, the inverse function of the second compensation value, and a function reflecting user information. In another example, the processor 320 may generate an output signal on the basis of a result of the convolution operation (time domain) of the external input signal, the first compensation value, the inverse function of the second compensation value, and the function reflecting the user information. For example, the memory 330 may store user information (for example, an audiogram) related to an auditory property of the user. For example, the user information is information related to user's hearing and may include at least one piece of information input by the user (for example, medical checkup data), information measured by the electronic device 300 (for example, the result of a test performed by the electronic device to identify a frequency band of a sound to which the user can listen), and/or information determined by the electronic device 300 on the basis of user preference (for example, information of analyzing a history of controlling a volume of the electronic device by the user).

According to an embodiment, the processor 320 may configure an audio equalizer (EQ) on the basis of the function generated according to the first compensation value, the second compensation value, and the user information and store the configured EQ value in the memory 330.

According to an embodiment, the processor 320 may transmit a synchronization signal to an external electronic device in order to synchronize a first output signal output from the speaker 350 and a second output signal output from a speaker of the external electronic device. For example, when the user wears the external electronic device on an ear (for example, the right ear), the external electronic device may be an electronic device having the same configuration as the electronic device 300 worn on the opposite ear (for example, the left ear). According to an embodiment, the external electronic device may receive the synchronization signal and perform control to synchronize the second output signal output from the speaker of the external electronic device with the first output signal.

Figure 5A:
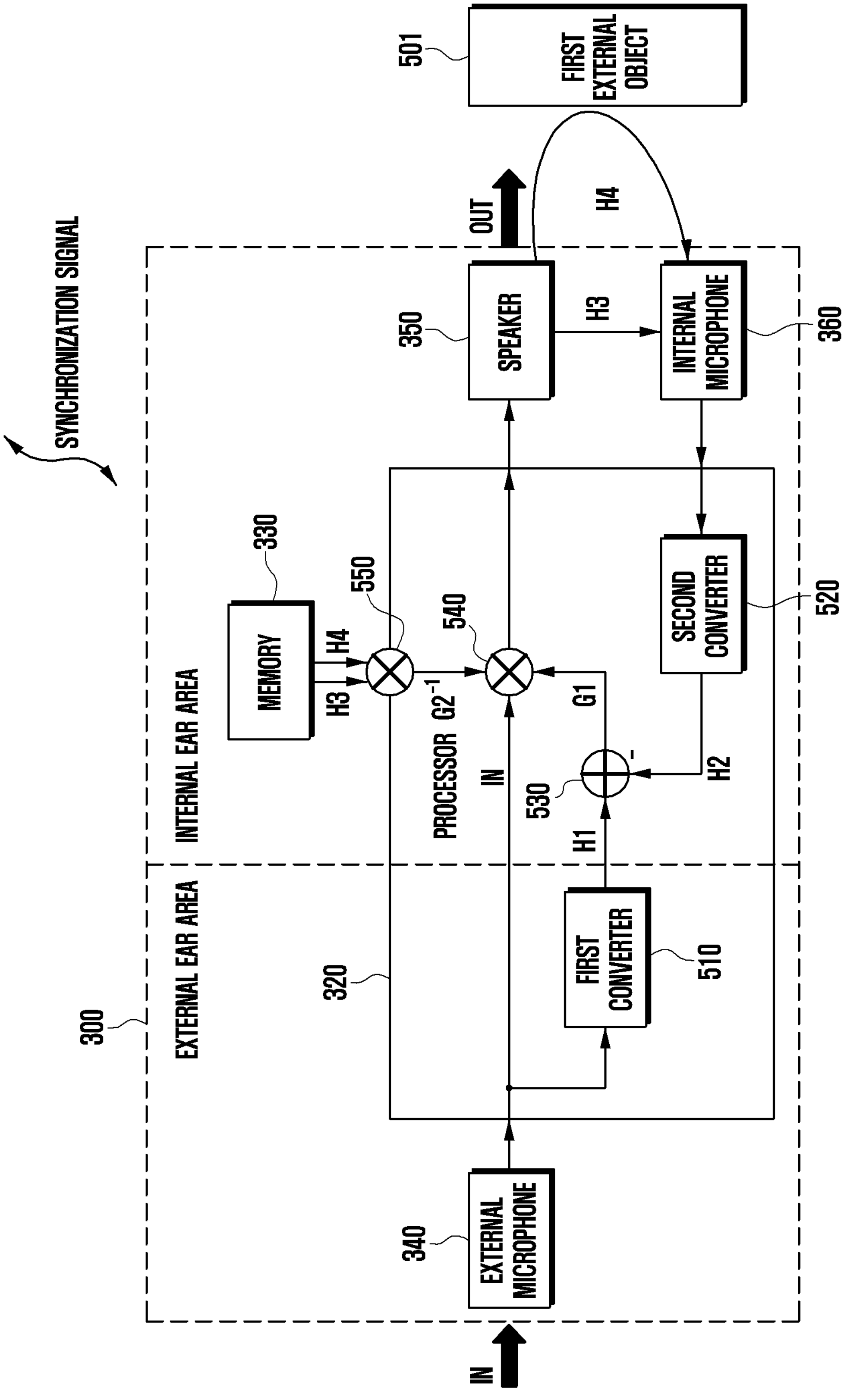
FIG. 5A is a diagram illustrating an example configuration of an electronic device using a standard auditory property and the flow of signals according to various embodiments.

FIG. 5A is a diagram illustrating an example configuration of an electronic device using a standard auditory property and the flow of signals according to various embodiments.

The electronic device 300 according to various embodiments of the disclosure may include the external microphone 340, the processor 320, the memory 330, the speaker 350, and/or the internal microphone 360.

The external microphone 340 according to various embodiments may be located in an external auditory meatus area of the electronic device 300 to acquire an external input signal (IN). According to an embodiment, the external input signal (IN) is a signal acquired by the external microphone 340 and may include at least some of the signals generated outside the electronic device 300. According to an embodiment, when the user wears the electronic device 300 on the ears, the external microphone 340 may be installed to be located near the external ears. According to an embodiment, the external microphone 340 may acquire the external input signal (IN) corresponding to a sound acquired from the outside. For example, the sound acquired by the external microphone 340 from the outside may be a sound generated around the user while the user is wearing the electronic device 300.

According to an embodiment, the external input signal may include one of an external sound wave, an external electric signal, and/or an external PCM signal.

According to an embodiment, the external microphone 340 may convert the acquired external sound wave into an external electric signal. For example, the external microphone 340 may convert the external sound wave which is an acoustic signal into an external electrical signal which is an electric signal. For example, the external microphone 340 may include a membrane (not shown), and may generate an external electrical signal corresponding to vibration of the membrane by the external signal.

According to an embodiment, the external microphone 340 may digitalize the converted external electrical signal into an external pulse coded modulation (PCM) signal. For example, the external microphone 340 may convert an external electrical signal which is an analog signal into an external PCM signal which is a digital signal. For example, the external microphone 340 may generate the external PCM signal through digitalization according to a process of sampling the external electrical signal into uniform sections, quantizing the same by a representative value of the sections, and encoding the same into a digital binary code The internal microphone 360 according to various embodiments may be located in the internal ear area of the electronic device 300 to acquire an internal input signal. According to an embodiment, the internal input signal is a signal acquired by the internal microphone 360 and may include at least some of the signals output by the speaker 350. According to an embodiment, when the user wears the electronic device 300 on his/her ears, the internal microphone 360 may be mounted to be located near the external auditory meatus. According to an embodiment, the internal microphone 360 may acquire an internal input signal corresponding to a sound acquired between the electronic device 300 and the first external object 501. For example, the sound acquired by the internal microphone 360 may be a sound output from the speaker 350 and/or a sound obtained after the sound output from the speaker 350 is reflected from a first external object 501.

According to an embodiment, the internal input signal may include at least one of an internal sound wave, an internal electrical signal, and/or an internal PCM signal.

According to an embodiment, the internal microphone 360 may convert the acquired internal sound wave into an internal electrical signal. For example, the internal microphone 360 may convert the internal sound wave which is an acoustic signal into an internal electrical signal which is an electric signal. For example, the internal microphone 360 may include a membrane (not shown), and may generate an internal electrical signal corresponding to vibration of the membrane by the internal sound waveform.

According to an embodiment, the internal microphone 360 may digitalize the converted internal electrical signal into an internal pulse coded modulation (PCM) signal. For example, the internal microphone 360 may convert an internal electrical signal which is an analog signal into an internal PCM signal which is a digital signal. For example, the internal microphone 360 may generate the external PCM signal through digitalization according to a process of sampling the internal electrical signal into uniform sections, quantizing the same by a representative value of the sections, and encoding the same into a digital binary code The memory 330 according to various embodiments may store a first transfer function (H3) and/or a second transfer function (H4).

According to an embodiment, the first transfer function (H3) may be a transfer function indicating a transfer characteristic of a signal according to a space between the speaker 350 and the internal microphone 360. For example, the first transfer function (H3) may be a function indicating the relationship (for example, size) between the signal output through the speaker 350 and the signal received by the internal microphone 360. For example, the first transfer function (H3) may be a function indicating a characteristic of the signal received by the internal microphone 360 according to a change in a frequency of the signal output through the speaker 350. According to an embodiment, the first transfer function (H3) may be generated on the basis of the signal output from the speaker 350 and the signal acquired by the internal microphone 360. For example, the first transfer function (H3) may be a function related to a characteristic of a path along which the signal output from the speaker 350 is input into the internal microphone 360. According to an embodiment, the first transfer function (H3) may be changed according to a change in the characteristic of the path.

According to an embodiment, the second transfer function (H4) may be a transfer function indicating a transfer characteristic of a signal according to a space between the speaker 350, the first external object 501, and the internal microphone 360. For example, the second transfer function (H4) may be a function indicating the relationship (for example, size) between the signal output through the speaker 350 and the signal reflected from the first external object 501 an then received by the internal microphone 360. For example, the second transfer function (H4) may be a function indicating a characteristic of the signal reflected from the first external object 501 and received by the internal microphone 360 according to the change in the frequency of the signal output through the speaker 350. According to an embodiment, the second transfer function (H4) may be generated on the basis of the signal output from the speaker 350 and the signal reflected from the first external object 501 and acquired by the internal microphone 360. For example, the second transfer function (H4) may be a function related to a characteristic of a path along which the signal output from the speaker 350 and reflected from the first external object 501 is input into the internal microphone 360. According to an embodiment, the second transfer function (H4) may be changed according to a change in the characteristic of the path. The first external object 501 may be a body part of the user (for example, the external auditory meatus and/or the eardrum of the user) wearing the electronic device 300. For example, the second transfer function (H4) may be a function related to a characteristic of a path based on a characteristic of the external auditory meatus and/or the eardrum of the user wearing the electronic device 300.

The processor 320 according to various embodiments may control a signal to be output from the speaker 350 on the basis of the signals acquired from the external microphone 340 and the internal microphone 360.

The processor 320 according to various embodiments may include a first converter 510, a second converter 520, a first compensation value generator 530, a second compensation value generator 550, and/or an output signal controller 540.

According to an embodiment, the first converter 510 may convert the converted external PCM signal which is the signal in the time domain into the external frequency signal (H1) which is the signal in the frequency domain. For example, the first converter 510 may perform fast Fourier transform (FFT) for the converted external PCM signal to generate the external frequency signal (H1).

According to an embodiment, the second converter 520 may convert the converted internal PCM signal which is the signal in the time domain into the internal frequency signal (H2) which is the signal in the frequency domain. For example, the second converter 520 may perform fast Fourier transform (FFT) for the converted internal PCM signal to generate the internal frequency signal (H2).

According to an embodiment, the first compensation value generator 530 may compare the external frequency signal (H1) and the internal frequency signal (H2) to calculate a first compensation value (G1). For example, the first compensation value generator 530 may calculate the first compensation value (G1) on the basis of a result (H1−H2) of difference between the external frequency signal (H1) and the internal frequency signal (H2).

According to an embodiment, the second compensation value generator 550 may calculate the second compensation value (G2) on the basis of the first transfer function (H3) and the second transfer function (H4) stored in the memory 330. For example, the second compensation value generator 550 may determine multiplication (H3×H4) (frequency domain) of the first transfer function (H3) and the second transfer function (H4) as the second compensation value (G2). In another example, the second compensation value generator 550 may determine a result of the convolution operation (H3*H4) (time domain) between the first transfer function (H3) and the second transfer function (H4) as the second compensation value (G2).

According to an embodiment, the output signal controller 540 may control a signal to be output from the speaker 350. According to an embodiment, the output signal controller 540 may input the external input signal (IN) acquired from the external microphone 340 into the function generated on the basis of the first compensation value (G1) and the second compensation value (G2) to generate an output signal (OUT). For example, the output signal controller 540 may generate the output signal (OUT) on the basis of a result of multiplication (frequency domain) ($IN \times G1 \times G2^{-1}$) of the external input signal (IN), the first compensation value (G1), and the inverse function ($G2^{-1}$) of the second compensation value. In another example, the output signal controller 540 may generate the output signal on the basis of a result of the convolution operation ($IN * G1 * G2^{-1}$) (time domain) among the external input signal (IN), the first compensation value (G1), and the inverse function ($G2^{-1}$) of the second compensation value. According to an embodiment, the output signal controller 540 may configure an audio equalizer (EQ) on the basis of the function generated according to the first compensation value (G1) and the second compensation value (G2) and store the configured EQ value in the memory 330.

According to an embodiment, the processor 320 may transmit a synchronization signal to an external electronic device in order to synchronize a first output signal (OUT) output from the speaker 350 and a second output signal output from a speaker of the external electronic device. For example, when the user wears the external electronic device on an ear (for example, the right ear), the external electronic device may be an electronic device having the same configuration as the electronic device 300 worn on the opposite ear (for example, the left ear). According to an embodiment, the external electronic device may receive the synchronization signal and perform control to synchronize the second output signal output from the speaker of the external electronic device with the first output signal (OUT).

Figure 5B:
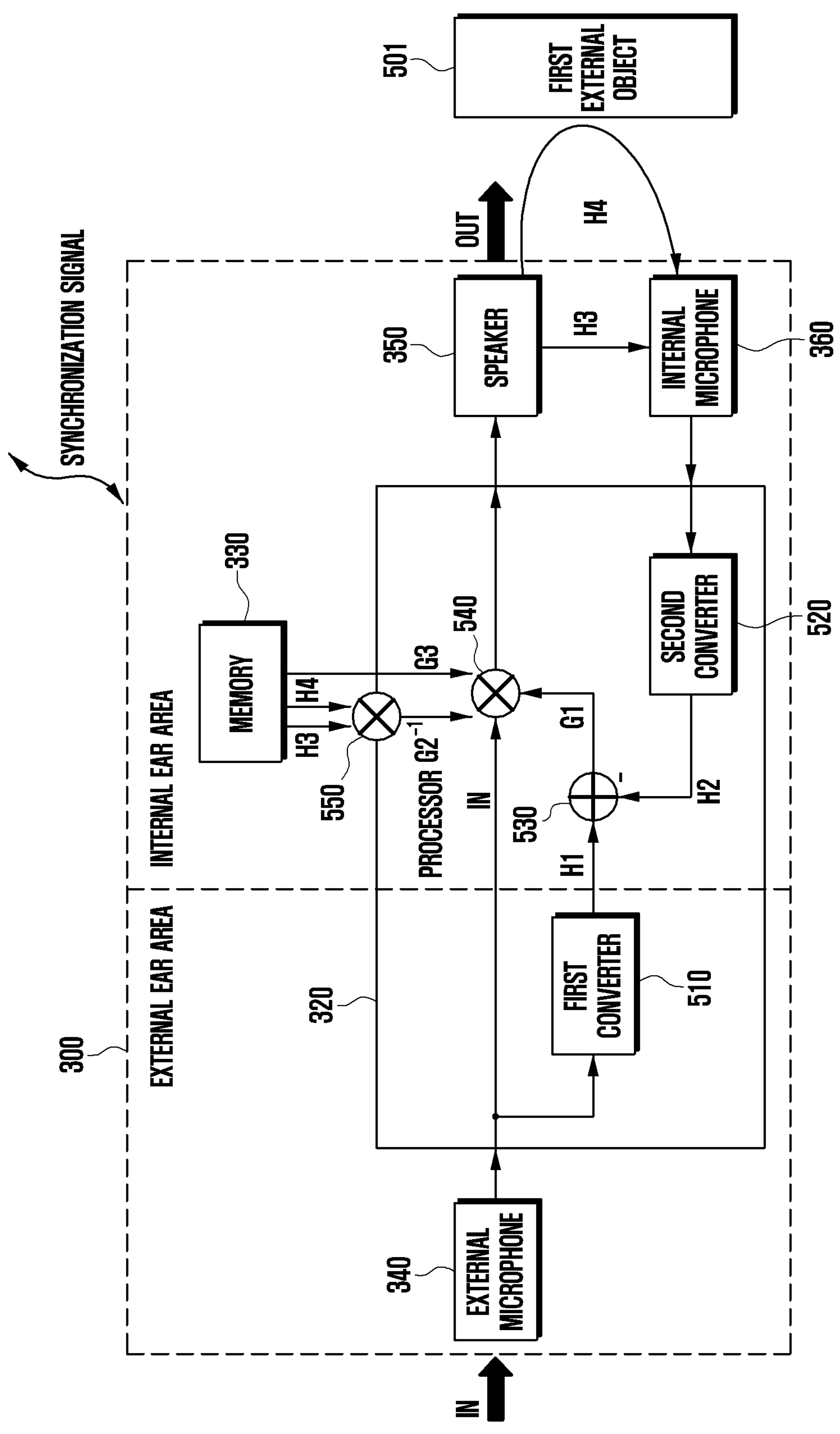
FIG. 5B is a diagram illustrating an example configuration of an electronic device using an auditory property of the user and the flow of signals according to various embodiments.

FIG. 5B illustrates an example configuration of an electronic device using an auditory property of the user and the flow of signals according to various embodiments.

The electronic device 300 according to various embodiments of the disclosure may include the external microphone 340, the processor 320, the memory 330, the speaker 350, and/or the internal microphone 360.

The external microphone 340 according to various embodiments may be located in an external auditory meatus area of the electronic device 300 to acquire an external input signal (IN). According to an embodiment, the external input signal (IN) is a signal acquired by the external microphone 340 and may include at least some of the signals generated outside the electronic device 300. According to an embodiment, when the user wears the electronic device 300 on the ears, the external microphone 340 may be installed to be located near the external ears. According to an embodiment, the external microphone 340 may acquire the external input signal (IN) corresponding to a sound acquired from the outside. For example, the sound acquired by the external microphone 340 from the outside may be a sound generated around the user while the user is wearing the electronic device 300.

According to an embodiment, the external input signal may include one of an external sound wave, an external electric signal, and/or an external PCM signal.

According to an embodiment, the external microphone 340 may convert the acquired external sound wave into an external electric signal. For example, the external microphone 340 may convert the external sound wave which is an acoustic signal into an external electrical signal which is an electric signal. For example, the external microphone 340 may include a membrane (not shown), and may generate an external electrical signal corresponding to vibration of the membrane by the external signal.

According to an embodiment, the external microphone 340 may digitalize the converted external electrical signal into an external pulse coded modulation (PCM) signal. For example, the external microphone 340 may convert an external electrical signal which is an analog signal into an external PCM signal which is a digital signal. For example, the external microphone 340 may generate the external PCM signal through digitalization according to a process of sampling the internal electrical signal into uniform sections, quantizing the same by a representative value of the sections, and encoding the same into a digital binary code The internal microphone 360 according to various embodiments may be located in the internal ear area of the electronic device 300 to acquire an internal input signal. According to an embodiment, the internal input signal is a signal acquired by the internal microphone 360 and may include at least some of the signals output by the speaker 350. According to an embodiment, when the user wears the electronic device 300 on his/her ears, the internal microphone 360 may be mounted to be located near the external auditory meatus. According to an embodiment, the internal microphone 360 may acquire an internal input signal corresponding to a sound acquired between the electronic device 300 and the first external object 501. For example, the sound acquired by the internal microphone 360 may be a sound output from the speaker 350 and/or a sound obtained after the sound output from the speaker 350 is reflected from a first external object 501.

According to an embodiment, the internal input signal may include at least one of an internal sound wave, an internal electrical signal, and/or an internal PCM signal.

According to an embodiment, the internal microphone 360 may convert the acquired internal sound wave into an internal electrical signal. For example, the internal microphone 360 may convert the internal sound wave which is an acoustic signal into an internal electrical signal which is an electric signal. For example, the internal microphone 360 may include a membrane (not shown), and may generate an internal electrical signal corresponding to vibration of the membrane by the internal sound waveform.

According to an embodiment, the internal microphone 360 may digitalize the converted internal electrical signal into an internal pulse coded modulation (PCM) signal. For example, the internal microphone 360 may convert an internal electrical signal which is an analog signal into an internal PCM signal which is a digital signal. For example, the internal microphone 340 may generate the external PCM signal through digitalization according to a process of sampling the internal electrical signal into uniform sections, quantizing the same by a representative value of the sections, and encoding the same into a digital binary code.

The memory 330 according to various embodiments may store a first transfer function (H3) and/or a second transfer function (H4).

According to an embodiment, the first transfer function (H3) may be a transfer function indicating a transfer characteristic of a signal according to a space between the speaker 350 and the internal microphone 360. For example, the first transfer function (H3) may be a function indicating the relationship (for example, size) between the signal output through the speaker 350 and the signal received by the internal microphone 360. For example, the first transfer function (H3) may be a function indicating a characteristic of the signal received by the internal microphone 360 according to a change in a frequency of the signal output through the speaker 350. According to an embodiment, the first transfer function (H3) may be generated on the basis of the signal output from the speaker 350 and the signal acquired by the internal microphone 360. For example, the first transfer function (H3) may be a function related to a characteristic of a path along which the signal output from the speaker 350 is input into the internal microphone 360. According to an embodiment, the first transfer function (H3) may be changed according to a change in the characteristic of the path.

According to an embodiment, the second transfer function (H4) may be a transfer function indicating a transfer characteristic of a signal according to a space between the speaker 350, the first external object 501, and the internal microphone 360. For example, the second transfer function (H4) may be a function indicating the relationship (for example, size) between the signal output through the speaker 350 and the signal reflected from the first external object 501 an then received by the internal microphone 360. For example, the second transfer function (H4) may be a function indicating a characteristic of the signal reflected from the first external object 501 and received by the internal microphone 360 according to the change in the frequency of the signal output through the speaker 350. According to an embodiment, the second transfer function (H4) may be generated on the basis of the signal output from the speaker 350 and the signal reflected from the first external object 501 and acquired by the internal microphone 360. For example, the second transfer function (H4) may be a function related to a characteristic of a path along which the signal output from the speaker 350 and reflected from the first external object 501 is input into the internal microphone 360. According to an embodiment, the second transfer function (H4) may be changed according to a change in the characteristic of the path. The first external object 501 may be a body part (for example, the external auditory meatus and/or the eardrum) of the user wearing the electronic device 300. For example, the second transfer function (H4) may be a function related to a characteristic of a path based on a characteristic of the external auditory meatus and/or the eardrum of the user wearing the electronic device 300.

According to an embodiment, the memory 330 may store user information (for example, an audiogram) related to an auditory property of the user. For example, the user information is information related to user's hearing and may include at least one piece of information input by the user (for example, medical checkup data), information measured by the electronic device 300 (for example, the result of a test performed by the electronic device to identify a frequency band of a sound to which the user can listen), and/or information determined by the electronic device 300 on the basis of user preference (for example, information of analyzing a history of controlling a volume of the electronic device by the user).

The processor 320 according to various embodiments may control a signal to be output from the speaker 350 on the basis of the signals acquired from the external microphone 340 and the internal microphone 360.

The processor 320 according to various embodiments may include a first converter 510, a second converter 520, a first compensation value generator 530, a second compensation value generator 550, and/or an output signal controller 540.

According to an embodiment, the first converter 510 may convert the converted external PCM signal which is the signal in the time domain into the external frequency signal (H1) which is the signal in the frequency domain. For example, the first converter 510 may perform fast Fourier transform (FFT) for the converted external PCM signal to generate the external frequency signal (H1).

According to an embodiment, the second converter 520 may convert the converted internal PCM signal which is the signal in the time domain into the internal frequency signal (H2) which is the signal in the frequency domain. For example, the second converter 520 may perform fast Fourier transform (FFT) for the converted internal PCM signal to generate the internal frequency signal (H2).

According to an embodiment, the first compensation value generator 530 may compare the external frequency signal (H1) and the internal frequency signal (H2) to calculate a first compensation value (G1). For example, the first compensation value generator 530 may calculate the first compensation value (G1) on the basis of a result (H1−H2) of difference between the external frequency signal (H1) and the external frequency signal (H2).

According to an embodiment, the second compensation value generator 550 may calculate the second compensation value (G2) on the basis of the first transfer function (H3) and the second transfer function (H4) stored in the memory 330. For example, the second compensation value generator 550 may determine multiplication (H3×H4) (frequency domain) of the first transfer function (H3) and the second transfer function (H4) as the second compensation value (G2). In another example, the second compensation value generator 550 may determine a result of the convolution operation (H3*H4) (time domain) between the first transfer function (H3) and the second transfer function (H4) as the second compensation value (G2).

According to an embodiment, the output signal controller 540 may control a signal to be output from the speaker 350. According to an embodiment, the output signal controller 540 may input the external input signal (IN) acquired from the external microphone 340 into a function (G3) reflecting the first compensation value (G1), the second compensation value (G2), and user information to generate the output signal (OUT). For example, the output signal controller 540 may generate the output signal (OUT) on the basis of a result of multiplication (frequency domain) ($IN \times G1 \times G2^{-1} \times G3$) of the external input signal (IN), the first compensation value (G1), the inverse function ($G2^{-1}$) of the second compensation value, and the function (G3) reflecting user information. In another example, the output signal controller 540 may generate the output signal on the basis of a result of the convolution operation (time domain) ($IN*G1*G2^{-1}*G3$) of the external input signal (IN), the first compensation value (G1), the inverse function ($G2^{-1}$) of the second compensation value, and the function (G3) reflecting user information. According to an embodiment, the output signal controller 540 may configure an audio equalizer (EQ) on the basis of the function generated according to the first compensation value (G1), the second compensation value (G2), and the user information and store the configured EQ value in the memory 330.

According to an embodiment, the processor 320 may transmit a synchronization signal to an external electronic device in order to synchronize a first output signal (OUT) output from the speaker 350 and a second output signal output from a speaker of the external electronic device. For example, when the user wears the electronic device 300 on an ear (for example, the right ear), the external electronic device may be an electronic device having the same configuration as the external electronic device worn on the opposite ear (for example, the left ear). According to an embodiment, the external electronic device may receive the synchronization signal and perform control to synchronize the second output signal output from the speaker of the external electronic device with the first output signal (OUT).

Figure 5C:
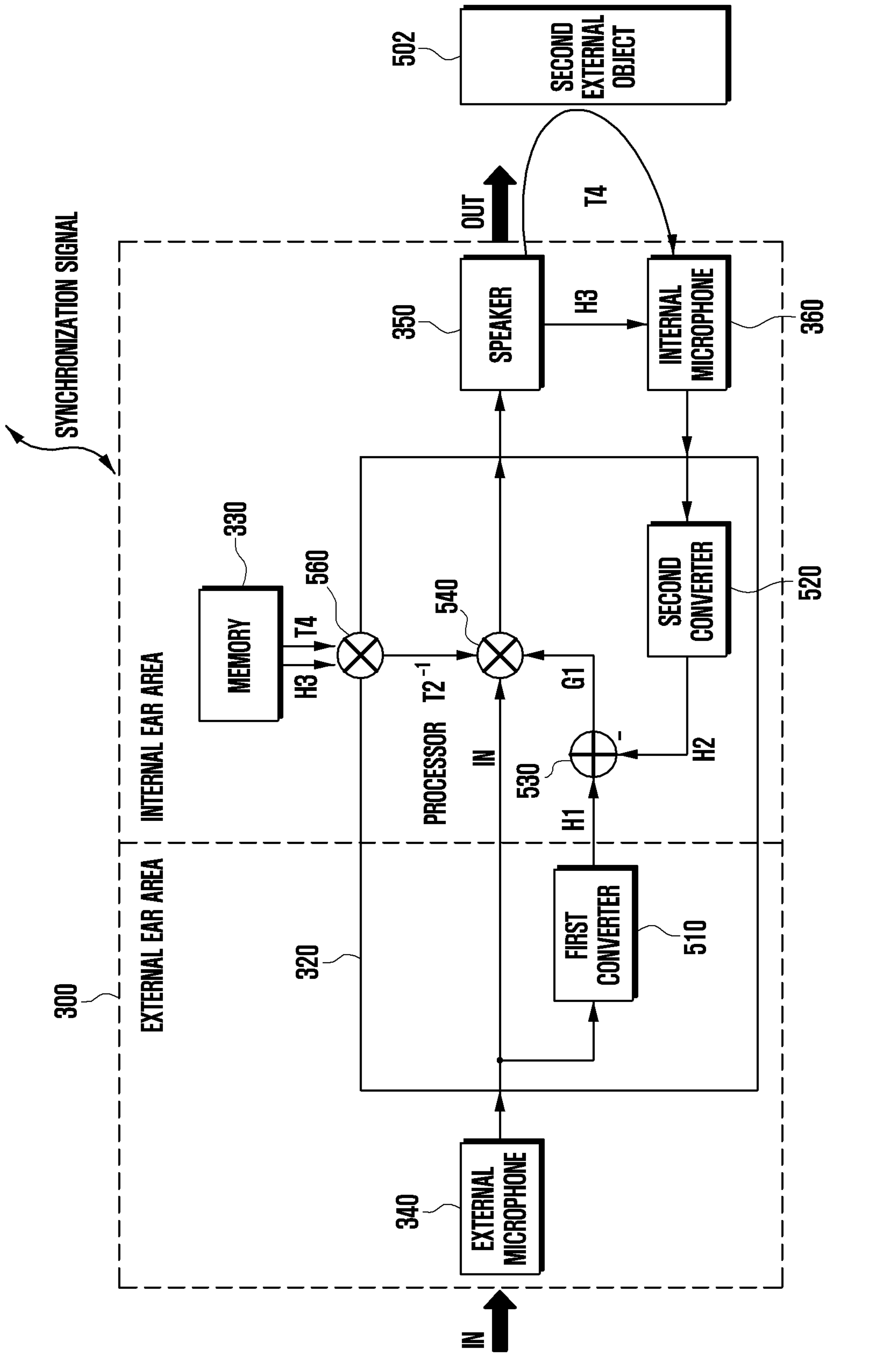
FIG. 5C is a diagram illustrating an example configuration of the electronic devices using a standard internal ear characteristic and the flow of signals according to various embodiments.

FIG. 5C is a diagram illustrating an example configuration of the electronic devices using a standard internal ear characteristic and the flow of signals according to various embodiments.

The electronic device 300 according to various embodiments of the disclosure may include the external microphone 340, the processor 320, the memory 330, the speaker 350, and/or the external microphone 360.

The external microphone 340 according to various embodiments may be located in an external auditory meatus area of the electronic device 300 to acquire an external input signal (IN). According to an embodiment, the external input signal (IN) is a signal acquired by the external microphone 340 and may include at least some of the signals generated outside the electronic device 300. According to an embodiment, when the user wears the electronic device 300 on the ears, the external microphone 340 may be installed to be located near the external ears. According to an embodiment, the external microphone 340 may acquire the external input signal (IN) corresponding to a sound acquired from the outside. For example, the sound acquired by the external microphone 340 from the outside may be a sound generated around the user while the user is wearing the electronic device 300.

According to an embodiment, the external input signal may include one of an external sound wave, an external electric signal, and/or an external PCM signal.

According to an embodiment, the external microphone 340 may convert the acquired external sound wave into an external electric signal. For example, the external microphone 340 may convert the external sound wave which is an acoustic signal into an external electrical signal which is an electric signal. For example, the external microphone 340 may include a membrane (not shown), and may generate an external electrical signal corresponding to vibration of the membrane by the external signal.

According to an embodiment, the external microphone 340 may digitalize the converted external electrical signal into an external pulse coded modulation (PCM) signal. For example, the external microphone 340 may convert an external electrical signal which is an analog signal into an external PCM signal which is a digital signal. For example, the external microphone 340 may generate the external PCM signal through digitalization according to a process of sampling the external electrical signal into uniform sections, quantizing the same by a representative value of the sections, and encoding the same into a digital binary code.

The internal microphone 360 according to various embodiments may be located in the internal ear area of the electronic device 300 to acquire an internal input signal. According to an embodiment, the internal input signal is a signal acquired by the internal microphone 360 and may include at least some of the signals output by the speaker 350. According to an embodiment, when the user wears the electronic device 300 on his/her ears, the internal microphone 360 may be mounted to be located near the external auditory meatus. According to an embodiment, the internal microphone 360 may acquire an internal input signal corresponding to a sound acquired between the electronic device 300 and the first external object 501. For example, the sound acquired by the internal microphone 360 may be a sound output from the speaker 350 and/or a sound obtained after the sound output from the speaker 350 is reflected from a first external object 501.

According to an embodiment, the internal input signal may include at least one of an internal sound wave, an internal electrical signal, and/or an internal PCM signal.

According to an embodiment, the internal microphone 360 may convert the acquired internal sound wave into an internal electrical signal. For example, the internal microphone 360 may convert the internal sound wave which is an acoustic signal into an internal electrical signal which is an electric signal. For example, the internal microphone 360 may include a membrane (not shown) and generate an internal electrical signal corresponding to vibration of the membrane by the internal sound wave signal.

According to an embodiment, the internal microphone 360 may digitalize the converted internal electrical signal into an internal pulse coded modulation (PCM) signal. For example, the internal microphone 360 may convert an internal electrical signal which is an analog signal into an internal PCM signal which is a digital signal. For example, the internal microphone 360 may generate the external PCM signal through digitalization according to a process of sampling the internal electrical signal into uniform sections, quantizing the same by a representative value of the sections, and encoding the same into a digital binary code.

The memory 330 according to various embodiments may store the first transfer function (H3) and/or a standard internal ear transfer function (T4).

According to an embodiment, the first transfer function (H3) may be a transfer function indicating a transfer characteristic of a signal according to a space between the speaker 350 and the internal microphone 360. For example, the first transfer function (H3) may be a function indicating the relationship (for example, size) between the signal output through the speaker 350 and the signal received by the internal microphone 360. For example, the first transfer function (H3) may be a function indicating a characteristic of the signal received by the internal microphone 360 according to a change in a frequency of the signal output through the speaker 350. According to an embodiment, the first transfer function (H3) may be generated on the basis of the signal output from the speaker 350 and the signal acquired by the internal microphone 360. For example, the first transfer function (H3) may be a function related to a characteristic of a path along which the signal output from the speaker 350 is input into the internal microphone 360. According to an embodiment, the first transfer function (H3) may be changed according to a change in the characteristic of the path.

According to an embodiment, the standard internal ear transfer function (T4) may be a transfer function indicating a transfer characteristic of the signal according to a space between the speaker 350, the first external object 501, and the internal microphone 360. For example, the standard internal ear transfer function (T4) may be a function indicating the relationship (for example, size) between the signal output through the speaker 350 and the signal reflected from the second external object 502 and then received by the internal microphone 360. For example, the standard internal ear transfer function (T4) may be a function indicating a characteristic of the signal reflected from the second external object 502 and then received by the internal microphone 360 according to a change in a frequency of the signal output through the speaker 350. According to an embodiment, the standard internal ear transfer function (T4) may be generated on the basis of the signal output from the speaker 350 and the signal reflected from the second external object 502 and acquired by the internal microphone 360. For example, the standard internal ear transfer function (T4) may be a function related to a characteristic of a path along which the signal output from the speaker 350 and reflected from the second external object 502 is input into the internal microphone 360. The second external object 502 may be an object (for example, MIC of head & torso system) for reflecting a standard internal ear characteristic. For example, the standard internal ear transfer function (T4) may be a function related to a characteristic of a path based on a characteristic of the standard of the internal ear structure.

The processor 320 according to various embodiments may control a signal to be output from the speaker 350 on the basis of the signals acquired from the external microphone 340 and the internal microphone 360.

The processor 320 according to various embodiments may include a first converter 510, a second converter 520, a first compensation value generator 530, a standard internal ear compensation value generator 560, and/or an output signal controller 540.

According to an embodiment, the first converter 510 may convert the converted external PCM signal which is the signal in the time domain into the external frequency signal (H1) which is the signal in the frequency domain. For example, the first converter 510 may perform fast Fourier transform (FFT) for the converted external PCM signal to generate the external frequency signal (H1).

According to an embodiment, the second converter 520 may convert the converted internal PCM signal which is the signal in the time domain into the internal frequency signal (H2) which is the signal in the frequency domain. For example, the second converter 520 may perform fast Fourier transform (FFT) for the converted internal PCM signal to generate the internal frequency signal (H2).

According to an embodiment, the first compensation value generator 530 may compare the external frequency signal (H1) and the internal frequency signal (H2) to calculate a first compensation value (G1). For example, the first compensation value generator 530 may calculate the first compensation value (G1) on the basis of a result (H1−H2) of difference between the external frequency signal (H1) and the external frequency signal (H2).

According to an embodiment, the standard internal ear compensation value generator 560 may calculate a second compensation value (T2) on the basis of the first transfer function (H3) stored in the memory 330 and the standard internal ear transfer function (T4). For example, the standard internal ear compensation value generator 560 may determine multiplication (H3×T4) (frequency domain) of the first transfer function (H3) and the standard internal ear transfer function (T4) as the standard internal ear compensation value (T2). In another example, the standard internal ear compensation value generator may determine a result of the convolution operation (H3*H4) (time domain) between the first transfer function (H3) and the standard internal ear transfer function (T4) as the standard internal ear compensation value (T2).

According to an embodiment, the output signal controller 540 may control a signal to be output from the speaker 350. According to an embodiment, the processor 320 may input the external input signal (IN) acquired from the external microphone 340 into the function generated on the basis of the first compensation value (G1) and the standard internal ear compensation value (T2) to control the output signal (OUT). For example, the processor 320 may generate the output signal (OUT) on the basis of a result of multiplication (frequency domain) ($IN \times G1 \times T2^{-1}$) of the external input signal (IN), the first compensation value (G1), and the inverse function ($T2^{-1}$) of the standard internal ear compensation value. In another example, the processor 320 may generate the output signal on the basis of a result of the convolution operation ($IN * G1 * T2^{-1}$) (time domain) between the external input signal (IN), the first compensation value (G1), and the inverse function ($T2^{-1}$) of the standard internal ear compensation value. According to an embodiment, the output signal controller 540 may configure an audio equalizer (EQ) on the basis of the function generated according to the first compensation value (G1) and the standard internal ear compensation value (T2) and store the configured EQ value in the memory 330.

According to an embodiment, the processor 320 may transmit a synchronization signal to an external electronic device in order to synchronize a first output signal (OUT) output from the speaker 350 and a second output signal output from a speaker of the external electronic device. For example, when the user wears the external electronic device on an ear (for example, the right ear), the external electronic device may be an electronic device having the same configuration as the electronic device 300 worn on the opposite ear (for example, the left ear). According to an embodiment, the external electronic device may receive the synchronization signal and perform control to synchronize the second output signal output from the speaker of the external electronic device with the first output signal (OUT).

Figure 6:
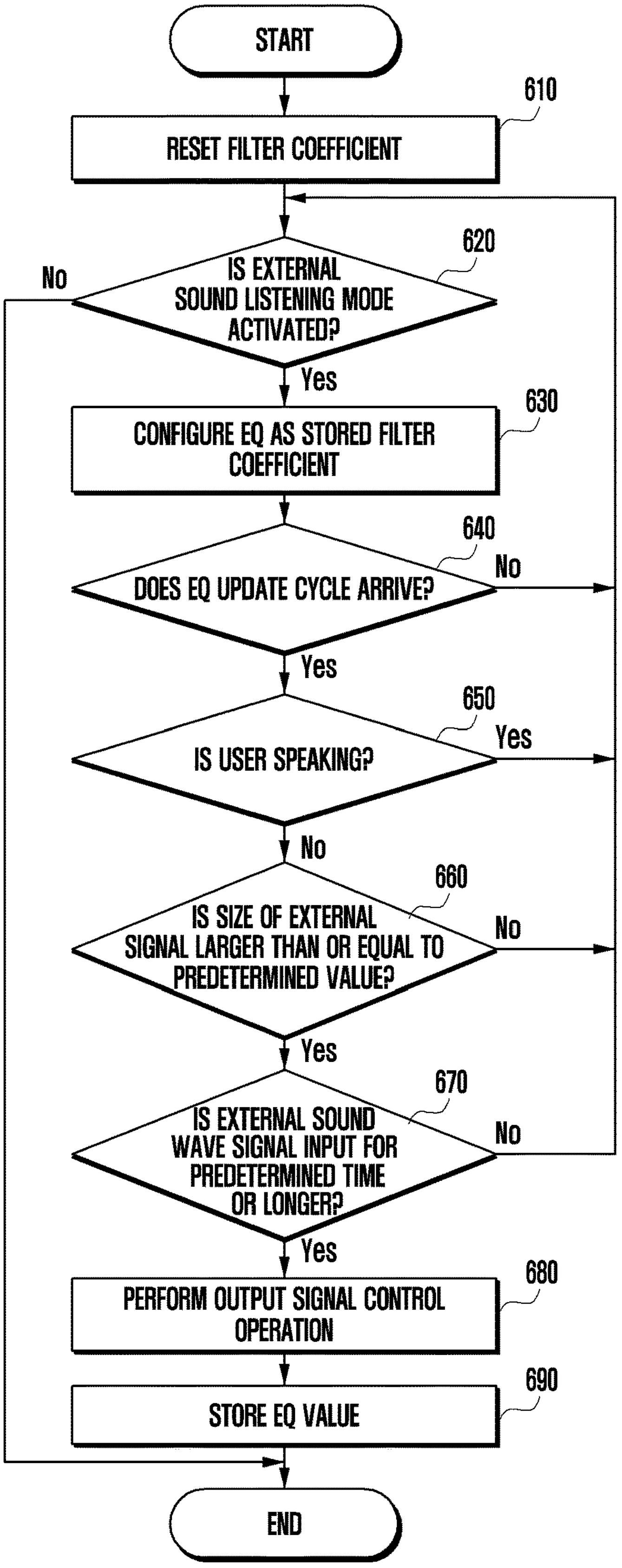
FIG. 6 is a flowchart illustrating an example method by which a processor performs an EQ update operation in response to an external sound listening mode according to various embodiments.

FIG. 6 is a flowchart illustrating an example method by which a processor (for example, the processor 320 of FIG. 3) performs an EQ update operation in accordance with an external sound listening mode according to various embodiments.

According to various embodiments, the processor 320 may reset a filter coefficient related to the control of an output signal in operation 610.

According to an embodiment, the filter coefficient may be a value related to a transfer function and/or a compensation value used by the processor 320 to control the output signal to be output from a speaker (for example, the speaker 350 of FIG. 3). According to an embodiment, the processor 320 may acquire the filter coefficient to be reset from a memory (for example, the memory 330).

According to various embodiments, the processor 320 may identify whether the external sound listening mode is activated in operation 620.

According to an embodiment, the external sound listening mode may be a mode related to an operation in which the processor 320 controls a signal to be output from the speaker 240 on the basis of a signal acquired from an external microphone (for example, the external microphone 340 of FIG. 3) and/or an internal microphone (for example, the internal microphone 360 of FIG. 3) in order to allow the user to hear sounds around the user while the user is wearing the electronic device 300.

According to an embodiment, the processor 320 may identify whether the external sound listening mode is activated as the user controls the electronic device 300. According to an embodiment, the processor 320 may identify whether the external sound listening mode is activated on the basis of a signal acquired from the external electronic device.

According to an embodiment, the processor 320 may end the operation according to deactivation (for example, No of operation 620) of the external sound listening mode.

According to various embodiments, the processor 320 may configure an audio equalizer (EQ) as a stored coefficient according to activation (for example, Yes of operation 620) of the external sound listening mode in operation 630.

According to an embodiment, the stored coefficient may be a coefficient generated through the operation in which the processor 320 controls the output signal according to operation 680. According to an embodiment, the processor 320 may acquire the stored coefficient from the memory 330.

According to various embodiments, the processor 320 may determine whether a predetermined (e.g., specified) cycle for an EQ update arrives in operation 640.

According to an embodiment, the processor 320 may perform again operation 620 as the predetermined cycle does not arrive (for example, No of operation 640).

According to various embodiments, the processor 320 may determine whether the user is speaking as the predetermined cycle arrives (for example, Yes of operation 640) in operation 650.

According to an embodiment, the processor 320 may analyze the signal acquired from the external microphone 340 and/or the internal microphone 360 and determine whether the user is speaking. For example, the processor 320 may analyze a frequency of the signal acquired from the external microphone 340 and/or the internal microphone 360 and determine whether the user is speaking according to a degree of matching between the frequency of the acquired signal and a frequency of a stored user voice. In another example, the processor 320 may analyze the signal acquired from the external microphone 340 and/or the internal microphone 360, determine whether the size of the acquired signal is larger than or equal to a predetermined value and/or the frequency of the acquired signal is a frequency type corresponding to a human speaking, and determine whether the user is speaking.

According to an embodiment, the processor 320 may perform again operation 620 according to the user who is speaking (for example, Yes of operation 650). That is, the processor 320 may not perform the EQ update operation and may repeatedly perform operations 620 to 650 while the user is speaking.

According to various embodiments, the processor 320 may determine whether the size of the external input signal acquired from the external microphone 340 is larger than or equal to a predetermined value according to the user who is not speaking (for example, No of operation 650) in operation 660.

According to an embodiment, the processor 320 may perform again operation 620 according to the size of external input signal which is smaller than the predetermined value (for example, No of operation 660). That is, the processor 320 may not perform the EQ update operation and repeatedly perform operations 620 to 660 when the external input signal is not larger than or equal to the predetermined size.

According to various embodiments, the processor 320 may determine whether the external input signal is input for a predetermined time or longer according to the size of the external input signal which is larger than or equal to the predetermined value (for example, Yes of operation 660) in operation 670.

According to an embodiment, the processor 320 may perform again operation 620 according to the external sound wave signal which is input for a time shorter than a predetermined time (for example, No of operation 670). That is, the processor 320 may not perform the EQ update operation and repeatedly perform operations 620 to 670 when the external input signal is not input for the predetermined time or longer.

According to various embodiments, the processor 320 may perform an output signal control operation according to the external sound wave signal which is input for the predetermined time or longer (Yes of operation 670) in operation 680.

According to an embodiment, the processor 320 may configure an EQ on the basis of the function generated according to operations 410 to 450 of FIG. 4 and perform the output signal control operation according to the configured EQ value.

According to an embodiment, when the leakage current is generated, the processor 320 may configure the EQ according to the stored filter coefficient without configuring the EQ according to operations 410 to 450 of FIG. 4.

According to various embodiments, the processor 320 may store the EQ value in the memory 330 on the basis of the function generated according to the result of the output signal control operation in operation 690.

An electronic device according to various example embodiments of the disclosure may include: a speaker, an external microphone configured to acquire an external signal of the electronic device, an internal microphone located within a specified distance of the speaker and configured to acquire an internal signal including a signal output from the speaker and/or a signal output from the speaker and reflected from an external object, a memory configured to store a first transfer function generated based on the signal output from the speaker, acquired by the internal memory, and/or a second transfer function generated based on the signal output from the speaker, acquired by the internal microphone, and reflected from the external object, and a processor operatively connected to the speaker, the external microphone, and the internal microphone, wherein the processor may be configured to: convert a signal acquired by the external microphone into an external frequency signal in a frequency domain, convert a signal acquired by the internal microphone into an internal frequency signal in the frequency domain, calculate a first compensation value, based on a result of comparison between the external frequency signal and the internal frequency signal, and control an output signal output from the speaker, based on an external signal acquired from the external microphone, the first compensation value, the first transfer function, and/or the second transfer function.

In the electronic device according to various example embodiments of the disclosure, the processor may be configured to: calculate a second compensation value, based on a result of multiplication of the first transfer function and the second transfer function and generate the output signal, based on a result of multiplication of the external signal, the first compensation value, and an inverse function of the second compensation value.

The electronic device according to various example embodiments of the disclosure may further include a memory configured to store an audiogram corresponding to auditory property information of a user, and the processor may be configured to: acquire the audiogram from the memory and generate the output signal, based on the external signal, the first compensation value, the first transfer function, the second transfer function, and/or the audiogram.

In the electronic device according to various example embodiments of the disclosure, the processor may be configured to generate the second transfer function, based on the signal output from the speaker, acquired by the internal microphone, and reflected from an external object having a specified characteristic.

In the electronic device according to various example embodiments of the disclosure, the processor may be configured to: transmit a synchronization signal to the external electronic device to synchronize a first output signal output from the speaker and a second output signal output from a speaker of the external electronic device.

In the electronic device according to various example embodiments of the disclosure, the processor may be configured to control the output signal on every specified operation cycle.

In the electronic device according to various example embodiments of the disclosure, the processor may be configured to: detect whether a user wearing the electronic device is speaking, based on the signal acquired by the external microphone and/or the internal microphone and control the output signal in response to detection of an end of the user speaking.

In the electronic device according to various example embodiments of the disclosure, the processor may be configured to control the output signal in response to a size of the external signal acquired from the external microphone which is greater than or equal to a specified value.

In the electronic device according to various example embodiments of the disclosure, the processor may be configured to control the output signal in response to acquisition of the external signal acquired from the external microphone which is input for a specified time or longer.

In the electronic device according to various example embodiments of the disclosure, the external microphone may be configured to: digitalize the external signal and convert the digitalized external signal into an external pulse coded modulation (PCM) signal, the internal microphone may be configured to digitalize the internal signal and convert the digitalized internal signal into an internal PCM signal, and the processor may be configured to: convert the external PCM signal into an external frequency signal using fast Fourier transform and convert the internal PCM signal into an internal frequency signal using fast Fourier transform.

A method of operating an electronic device according to various example embodiments of the disclosure may include: converting an external signal of the electronic device acquired by an external microphone into an external frequency signal in a frequency domain, converting a signal output from a speaker, acquired by the internal microphone and/or a signal output from the speaker and reflected from an external object into an internal frequency signal in the frequency domain, calculating a first compensation value, based on a result of comparison between the external frequency signal and the internal frequency signal, and controlling an output signal output from the speaker, based on a first transfer function generated based on the external signal, the first compensation value, and the signal output from the speaker, acquired by the internal microphone and/or a second transfer function generated based on the signal output from the speaker, acquired by the internal microphone, and reflected by an external object.

The method of operating the electronic device according to various example embodiments of the disclosure may include: calculating second compensation value, based on a result of multiplication of the first transfer function and the second transfer function and generating the output signal, based on a result of multiplication of the external signal, the first compensation value, and an inverse function of the second compensation value.

The method of operating the electronic device according to various example embodiments of the disclosure may include: acquiring an audiogram corresponding to auditory property information of the user from the memory and generating the output signal, based on the external signal, the first compensation value, the first transfer function, the second transfer function, and/or the audiogram.

The method of operating the electronic device according to various example embodiments of the disclosure may include: generating the second transfer function, based on the signal output from the speaker, acquired by the internal microphone, and reflected from an external object having a specified characteristic.

The method of operating the electronic device according to various example embodiments of the disclosure may further include: transmitting a synchronization signal to the external electronic device to synchronize a first output signal output from the speaker and a second output signal output from a speaker of the external electronic device.

The method of operating the electronic device according to various example embodiments of the disclosure may further include controlling the output signal on every specified operation cycle.

The method of operating the electronic device according to various example embodiments of the disclosure may further include: detecting whether a user wearing the electronic device is speaking, based on the signal acquired by the external microphone and/or the internal microphone and controlling the output signal in response to detection of an end of the user speaking.

The method of operating the electronic device according to various example embodiments of the disclosure may further include controlling the output signal in response to a size of the external signal acquired from the external microphone which is greater than or equal to a specified value.

The method of operating the electronic device according to various example embodiments of the disclosure may further include controlling the output signal in response to acquisition of the external signal acquired from the external microphone which is input for a specified time or longer.

The method of operating the electronic device according to various example embodiments of the disclosure may include: converting an external PCM signal obtained by digitalizing the external signal acquired by the external microphone into an external frequency signal using fast Fourier transform and converting an internal PCM signal obtained by digitalizing the signal acquired by the internal microphone into an internal frequency signal using fast Fourier transform.

The various embodiments and terms used herein are not intended to limit the technical features described herein to any particular embodiment, and should be understood to include various modifications, equivalents, or substitutions of such embodiments.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

And the embodiments disclosed herein, as disclosed herein and the drawings, are presented by way of specific examples only to facilitate the description and understanding of the embodiments disclosed herein, and are not intended to limit the scope of the embodiments disclosed herein. Accordingly, the scope of the various embodiments disclosed herein should be construed to include, in addition to the embodiments disclosed herein, all modifications or variations derived from the technical ideas of the various embodiments disclosed herein.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a speaker;

a first microphone configured to acquire an external signal of the electronic device;

a second microphone located within a specified distance of the speaker and configured to acquire an internal signal comprising a signal output from the speaker and a signal output from the speaker and reflected from an external object;

memory storing instructions, a first transfer function and a second transfer function; and at least one processor operatively connected to the speaker, the first microphone, and the second microphone, wherein the instructions, when executed by the at least one processor individually or collectively, cause the electronic device to:

convert a signal acquired by the first microphone into an first frequency signal in a frequency domain;

convert a signal acquired by the second microphone into an second frequency signal in the frequency domain;

calculate a first compensation value, based on a comparison between the first frequency signal and the second frequency signal; and control an output signal output from the speaker, based on an external signal acquired from the first microphone, the first compensation value, an inverse of a result of a multiplication in the frequency domain of the first transfer function; and/or the second transfer function, wherein the first transfer function indicates a characteristic of a direct acoustic path between the speaker and the second microphone, wherein the second transfer function indicates a characteristic of a reflected acoustic path from the speaker to the second microphone via a standard external object that models a standard internal ear characteristic.

2. The electronic device of claim 1, wherein the instructions, when executed by at least one processor, cause the electronic device to:

calculate a second compensation value, based on the multiplication of the first transfer function and the second transfer function; and generate the output signal, based on multiplication of the external signal, the first compensation value, and an inverse function of the second compensation value.

3. The electronic device of claim 1, further comprising a memory configured to store an audiogram corresponding to auditory property information of a user, wherein the instructions, when executed by at least one processor, cause the electronic device to:

acquire the audiogram from the memory; and generate the output signal, based on the external signal, the first compensation value, the first transfer function, the second transfer function, and/or the audiogram.

4. The electronic device of claim 1, wherein the instructions, when executed by at least one processor, cause the electronic device to transmit a synchronization signal to the external electronic device to synchronize a first output signal output from the speaker and a second output signal output from a speaker of the external electronic device.

5. The electronic device of claim 1, wherein the instructions, when executed by at least one processor, cause the electronic device to control the output signal on every specified operation cycle.

6. The electronic device of claim 1, wherein the instructions, when executed by at least one processor, cause the electronic device to:

detect whether a user wearing the electronic device is speaking, based on the signal acquired by the first microphone and/or the second microphone; and control the output signal in response to detection of an end of the user speaking.

7. The electronic device of claim 1, wherein the instructions, when executed by at least one processor, cause the electronic device to control the output signal in response to a size of the external signal acquired from the first microphone being greater than or equal to a specified value.

8. The electronic device of claim 1, wherein the instructions, when executed by at least one processor, cause the electronic device to control the output signal in response to acquisition of the external signal acquired from the first microphone input for a specified time or longer.

9. The electronic device of claim 1, wherein the first microphone is configured to digitalize the external signal and convert the digitalized external signal into an external pulse coded modulation (PCM) signal, wherein the second microphone is configured to digitalize the internal signal and convert the digitalized internal signal into an internal PCM signal, and wherein the instructions, when executed by at least one processor, cause the electronic device to:

convert the external PCM signal into an first frequency signal using fast Fourier transform; and convert the internal PCM signal into an second frequency signal using fast Fourier transform.

10. A method of operating an electronic device, the method comprising:

converting an external signal acquired by an first microphone into an first frequency signal in a frequency domain;

converting a signal output from a speaker, acquired by the second microphone and a signal output from the speaker and reflected from an external object into an second frequency signal in the frequency domain;

calculating a first compensation value, based on the first frequency signal and the second frequency signal; and controlling an output signal output from the speaker, based on an external signal acquired from the first microphone, the first compensation value, an inverse of a result of a multiplication in the frequency domain of a first transfer function and a second transfer function;

wherein the first transfer function indicates a characteristic of a direct acoustic path between the speaker and the second microphone, wherein the second transfer function indicates a characteristic of a reflected acoustic path from the speaker to the second microphone via a standard external object that models a standard internal ear characteristic.

11. The method of claim 10, further comprising:

calculating a second compensation value, based on multiplication of the first transfer function and the second transfer function; and generating the output signal, based on multiplication of the external signal, the first compensation value, and an inverse function of the second compensation value.

12. The method of claim 10, further comprising:
acquiring an audiogram corresponding to auditory property information of a user from the memory; and
generating the output signal, based on the external signal, the first compensation value, the first transfer function, the second transfer function, and/or the audiogram.

13. The method of claim 10, further comprising: transmitting a synchronization signal to the external electronic device to synchronize a first output signal output from the speaker and a second output signal output from a speaker of the external electronic device.

14. The method of claim 10, further comprising controlling the output signal on every specified operation cycle.

15. The method of claim 10, further comprising:
detecting whether a user wearing the electronic device is speaking, based on the signal acquired by the first microphone and/or the second microphone; and
controlling the output signal in response to detection of an end of the user speaking.

16. The method of claim 10, further comprising controlling the output signal in response to a size of the external signal acquired from the first microphone being greater than or equal to a specified value.

17. The method of claim 10, further comprising controlling the output signal in response to acquisition of the external signal acquired from the first microphone input for a specified time or longer.

18. The method of claim 10, comprising:
converting an external pulse code modulation (PCM) signal obtained by digitalizing the external signal acquired by the first microphone into an first frequency signal using fast Fourier transform; and
converting an internal PCM signal obtained by digitalizing the signal acquired by the second microphone into an second frequency signal using fast Fourier transform.

* * * * *